US010552135B1

(12) United States Patent
Gershnik et al.

(10) Patent No.: US 10,552,135 B1
(45) Date of Patent: *Feb. 4, 2020

(54) REDUCING A SIZE OF AN APPLICATION PACKAGE

(71) Applicant: Amazon Technologies, Inc., Reno, NV (US)

(72) Inventors: Eugene Gershnik, Sammamish, WA (US); Matthew B. Barr, Seattle, WA (US); Jacob D. Cohen, Kirkland, WA (US); John M. Pyle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/268,376

(22) Filed: Sep. 16, 2016

Related U.S. Application Data

(63) Continuation of application No. 13/595,799, filed on Aug. 27, 2012, now Pat. No. 9,448,782.

(51) Int. Cl.
G06F 9/445 (2018.01)
G06F 8/61 (2018.01)

(52) U.S. Cl.
CPC ..................... G06F 8/61 (2013.01)

(58) Field of Classification Search
CPC .................................. G06F 8/61–65
USPC ................................ 717/168–178
See application file for complete search history.

(56) References Cited

U.S. PATENT DOCUMENTS

| 5,473,777 | A | 12/1995 | Moeller et al. | |
| 6,066,181 | A * | 5/2000 | DeMaster | G06F 8/30 717/148 |
| 6,272,674 | B1 | 8/2001 | Holiday, Jr. | |
| 6,275,983 | B1 | 8/2001 | Orton et al. | |
| 6,289,512 | B1 * | 9/2001 | Edwards | G06F 8/61 717/178 |
| 6,542,887 | B1 | 4/2003 | Abbott | |
| 6,629,111 | B1 | 9/2003 | Stine et al. | |
| 6,675,382 | B1 * | 1/2004 | Foster | G06F 8/61 707/999.001 |
| 6,983,315 | B1 | 1/2006 | Crutcher | |
| 7,472,375 | B2 | 12/2008 | Ye et al. | |
| 2002/0087737 | A1 | 7/2002 | Czajkowski et al. | |
| 2004/0068560 | A1 | 4/2004 | Oulu et al. | |
| 2004/0103114 | A1 * | 5/2004 | Sesma | G06F 9/541 |

(Continued)

OTHER PUBLICATIONS

P. Simon Tuffs, "Simplify your application delivery with One-JAR", 2004, IBM developerWorks.*

(Continued)

Primary Examiner — Jue Louie
(74) Attorney, Agent, or Firm — Lee & Hayes, P.C.

(57) ABSTRACT

Some examples include techniques for efficiently handling an application package. For instance, a native code library used by an application may be identified. A wrapper library that enables the application to access the native code library may be created. The wrapper library may be stored in a first area of the application package. The native code library may be stored in a second area of the application package. If the application package includes more than one native code library, the application package may include a loading order specifying an order in which the native code libraries are to be loaded into a memory of a computing device.

19 Claims, 5 Drawing Sheets

(56) References Cited

U.S. PATENT DOCUMENTS

| | | | |
|---|---|---|---|
| 2004/0158813 A1 | 8/2004 | Xia et al. | |
| 2005/0114672 A1* | 5/2005 | Duncan | G06F 21/10 |
| | | | 713/182 |
| 2006/0129989 A1 | 6/2006 | Fleischer | |
| 2007/0169041 A1 | 7/2007 | Kojima et al. | |
| 2009/0172657 A1* | 7/2009 | Makelainen | G06F 9/44521 |
| | | | 717/174 |
| 2010/0199268 A1 | 8/2010 | Frost | |
| 2010/0306759 A1 | 12/2010 | Kohler et al. | |
| 2012/0047494 A1 | 2/2012 | Unrein et al. | |
| 2014/0026214 A1 | 1/2014 | Adams et al. | |

OTHER PUBLICATIONS

P.Simon Tuffs, "Delivery Your Java Application in One-JAR!", 2010.*

Chang, "Custom Class Loading in Dalvik", retrieved on Jun. 1, 2015 at <<http://android-developers.blogspot.com/2011/07/custom-class-loading-in-dalvik.html>>, Android Developers Blog, Jun. 22, 2008.

JDotSoft.com, "Class JarClassLoader", retrieved on May 29, 2015 at <<http://www.jdotsoft.com/JarClassLoader.php>>, pp. 1-3.

Liou, "Packaging Android Libraries with Native Code", retrieved on May 26, 2015 at <<http://www.crittercism.com/blog/packagin-android-libraries-with-native-code>>, pp. 1-8.

Office Action for U.S. Appl. No. 13/595,799, dated Oct. 31, 2014, Eugene Gershnik, "Reducing a Size of an Application Package", 24 pages.

Final Office Action for U.S. Appl. No. 13/595,799, dated Jun. 4, 2015, Eugene Gershnik, "Reducing a Size of an Application Package", 28 pages.

* cited by examiner

REDUCING A SIZE OF AN APPLICATION PACKAGE

CROSS REFERENCE TO RELATED PATENT APPLICATIONS

This application is a continuation of and claims priority from U.S. patent application Ser. No. 13/595,799 titled "Reducing a Size of an Application Package," filed on Aug. 27, 2012, which is herein incorporated by reference in its entirety.

BACKGROUND

Computing devices may use a variety of operating systems. Some operating systems may not efficiently handle application packages. An application package may include an application and one or more code libraries, such as native code libraries, that are used by an application. Inefficient handling of application packages may detract from a user's experience when interacting with the computing devices.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
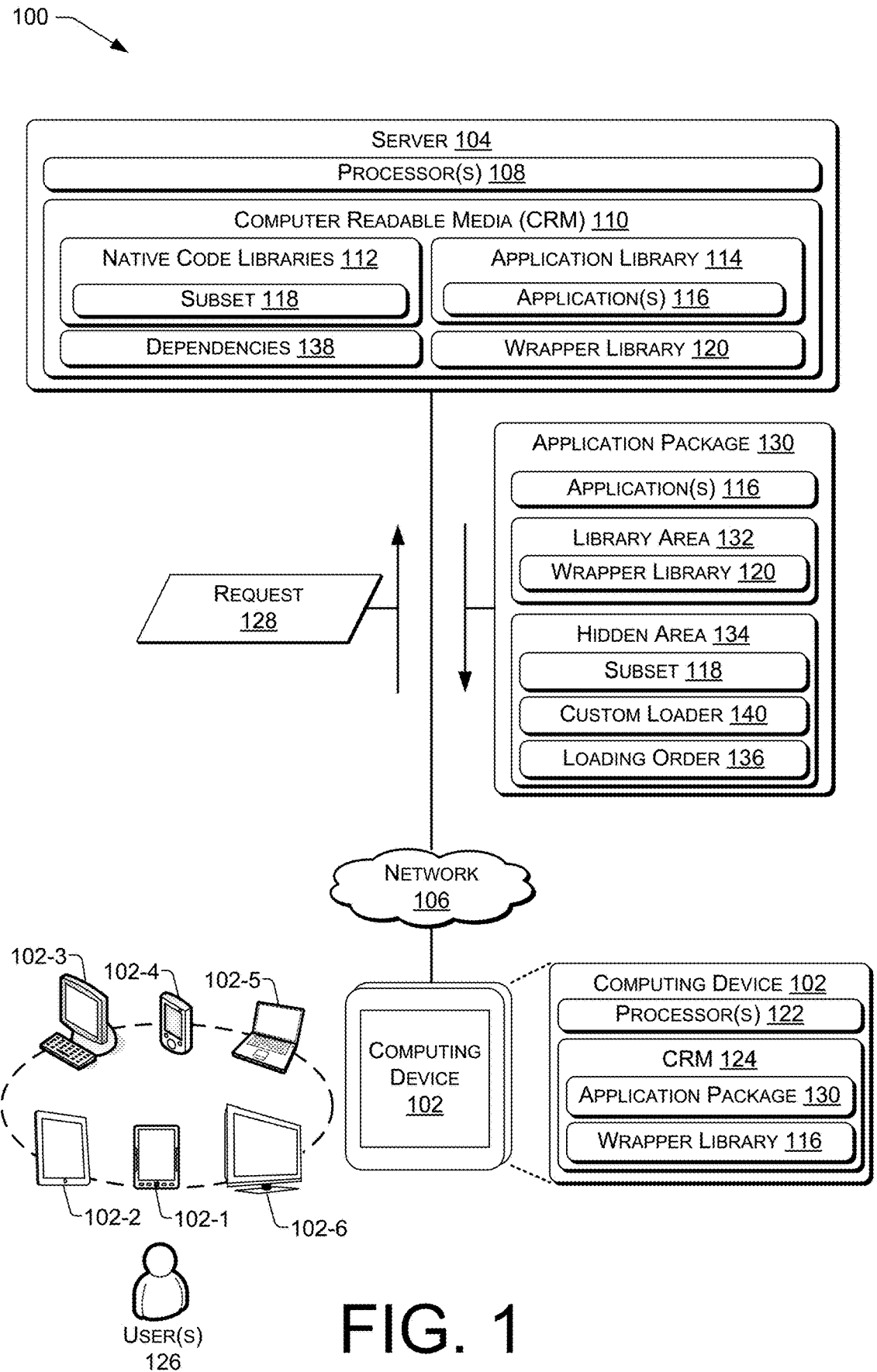
FIG. 1 is an illustrative architecture that includes creating an application package that includes a wrapper library according to some embodiments.

The systems and techniques described herein may be used to create application packages (APK). For example, an application package may be created on a server for installation on multiple computing devices, such as mobile phones, tablet computing devices, and/or electronic book (eBook) readers. In some implementations, the application package may be a file that includes an application and one or more code libraries, such as native code libraries, that are used by the application. For example, the term native code may refer to computer programming (code) that is compiled to run with a particular processor (such as an Intel x86-class processor or an ARM processor) using a set of instructions that the processor is capable of executing. Consequently, if the same program is run on a computer with a different processor, software may be provided so that the computer emulates the original processor. In this case, the original program may run in "emulation mode" on the different processor. However, the code may run more slowly in emulation module as compared to running in native mode on the original processor.

In some examples, herein, the native code library may include instructions that the processor can natively execute, e.g., instructions from an instruction set of the processor, without using an emulation mode, a virtual machine, or the like. Thus, the native code libraries provided herein may be more efficient in terms of execution speed and code size compared to a scripting language, but may involve constructing a compiler to compile the programs to the native code for each supported hardware device. For example, the native code libraries may be used for certain tasks, such as time critical calculations or computationally intensive tasks, while applications that are written in a programming language that is interpreted by a virtual machine at runtime may be used for other tasks, such as non-time critical or non-computationally intensive tasks. In addition, to achieve a balance between portability and efficiency, some applications herein may be written in programming languages that run in emulation module (e.g., virtual machine) and the applications may call native code libraries to perform functions that are time critical, computationally intensive, or the like.

According to some examples herein, when creating an application package, one or more software applications may be selected for inclusion in the application package. For example, the one or more software applications may be part of an application suite that provides a specific set of functions. The one or more software applications may include calls to a subset of native code libraries for a particular hardware device. In some cases, a server may examine the software applications to identify the subset of native code libraries. Thus, the server may include the software applications and the subset of native code libraries in the application package. In some implementations, at least a portion of the software applications and the subset of native code libraries may be compressed and stored in the application package in a compressed format.

The server may determine whether two or more of the native code libraries may have dependencies. The server may determine a loading order of the native code libraries based on the dependencies. In some cases, the loading order may specify an order in which the native code libraries are to be loaded into a memory of a computing device. For example, library A may have a dependency on library B (e.g., library B is to be loaded before library A) and library B may have a dependency on library C (e.g., library C is to be loaded before library B). In this example, the loading order may be library C, followed by library B, followed by library A. The loading order may be explicit or implicit. For example, an explicit loading order may be specified in a loading order file, e.g., the loading order file may specify an order in which to load the native code libraries. In addition to the loading order, the file may include a location of each native code library in the application package. An implicit loading order may be specified by storing the native code libraries in the application package in the order in which the native code libraries are to be loaded into memory. If an implicit loading order is used, a loader may read the native code libraries sequentially from the application package and load the native code libraries into a memory of the computing device in the order that the native code libraries were stored in the application package. Specifying a loading order (e.g., either explicitly or implicitly) in the application package may reduce or eliminate a time taken by an installer on a computing device to determine dependencies and a loading order during installation of the application package on the computing device.

In some implementations, the server may include a custom loader in the application package. The custom loader may load the native code libraries into a memory of a computing device based on the loading order. The custom loader may be provided in the application package for various reasons. For example, an application package installer on the computing device may install portions of the application package after the application package is received by the computing device (e.g., during installation of the application package). In contrast, the custom loader may load the native code libraries into a memory of the computing device when a particular application begins executing on the computing device.

Additionally, in some examples, to enable the software applications to access the native code library, a wrapper library may be created and stored in the application package. The wrapper library may be a relatively small layer of software code that is used to translate from one interface to another interface. For example, a first application may make a call to a second application to perform a particular function. Over time, the function performed by the second application may become more complex, more time critical, or both. A native code library may be created to perform the function performed by the second application. To avoid rewriting every application that calls the second application, a wrapper library may be written to receive calls to the second application and forward (e.g., translate) the calls to the native code library. For example, the wrapper library may receive parameters X, Y and Z from the calling application and pass the parameters X, Y and Z to the native code library function. The native code library function may initiate performing the requested function and return a result to the wrapper library. The result may include an outcome from performing the function, an indication as to whether the requested function was successfully performed, whether an error occurred, a type of error that occurred, other information associated with the result, or any combination thereof.

As one example, the server may create the wrapper library based on the subset of native code libraries that are to be included in the application package. After creating the wrapper library, the server may store the wrapper library in the application package. In some cases, at least a portion of the wrapper library may be compressed and stored in the application package in a compressed format. The custom loader and the wrapper library may be packaged into a single file that is stored in the application package.

In some implementations, the application package may be created by an application developer and the application package may be made available for acquisition in an application marketplace. In other implementations, the application package may be created "on demand," e.g., in response to a request to acquire the application or in response to a server determining that a computing device has an older version of an application that is to be updated to a newer version. Of course, in some other implementations, some application packages may be created by application developers while other application packages may be created on demand.

In the examples described herein, an application package may have one or more areas that are used for specific purposes. For example, the application package may include a first area (e.g., a library area) that is used to store the wrapper libraries and a second area that is used to store the native code libraries. The second area may be referred to as a hidden area because when an application package installer of the computing device is installing the application package, the application package installer may access the first area, but not access the second area. When the application package installer is installing the application package on the computing device, the application package installer may extract one or more applications from the application package and install the applications on the computing device. If the applications were stored in a compressed format in the application package, the application package installer may uncompress the applications before installing the applications. In addition, the application package installer may access the first area and install the wrapper libraries and the custom loader. The application package installer may store the application package in a file system (e.g., memory) of the computing device. If the wrapper libraries and/or the custom loader were stored in a compressed format in the application package, the application package installer may uncompress the wrapper libraries and/or the custom loader before installing the wrapper libraries and/or the custom loader. Thus, after an application package is received by the computing device, an application package installer may install the application package by locating the wrapper library in a library area of the application package, uncompressing the wrapper library (if needed), and installing the wrapper library into the memory of the computing device. The amount of time taken to install the application package may be reduced because the application package installer installs a relatively smaller wrapper library instead of determining dependencies and installing native code libraries.

The native code libraries may remain stored in a compressed format in the application package in the memory of the computing device until an application begins executing. For example, when execution of an application is initiated, the application may instruct the custom loader to load native code libraries into the memory of the computing device to enable the application to call (e.g., use) the native code libraries. The custom loader may load the native code libraries based on the loading order (e.g., implicit loading order or explicit loading order) from the application package into the memory of the computing device. When the application ceases execution, the native code libraries may be unloaded (e.g., removed) from the memory of the computing device. Thus, the native code libraries may be loaded into a file system (e.g., a memory) of the computing device when an application is selected for execution (e.g., at run-time) rather than when the application package is installed. To prevent an application package installer from installing the native code libraries when installing the application package, the native code libraries may be stored in a hidden area of the application package. The hidden area may be an area of the application package that is not normally accessed by the application installer when installing the application package (e.g., APK). Thus, storing the native code library in the hidden area may avoid loading two copies of the native code libraries (e.g., the compressed native code libraries in the application package and the uncompressed native code libraries stored in the file system of the computing device). Thus, an application package can be efficiently installed by using a single application package that includes a set of native code libraries that are used by one or more applications.

The systems and techniques described herein may (i) reduce memory usage by reducing duplication of native code libraries, (ii) reduce application package installation time (e.g., because a wrapper library rather than native code libraries are installed when the application package is installed), and (iii) reduce the time to load native code libraries by providing a loading order (e.g., implicitly or explicitly) by resolving dependencies prior to installation of the application package. These efficiencies may result in a more enjoyable user experience for a user who installs an application package on a computing device.

Illustrative Architecture

FIG. 1 is an illustrative architecture 100 that includes creating and sending an application package that includes a wrapper library according to some embodiments. The architecture 100 includes a client 102 coupled to a server 104 via a network 106. The server 104 may be comprised of multiple virtual servers, multiple physical servers, or a combination of both. The server 104 may include one or more processors 108 and one or more computer-readable media 110 (e.g., memory). In some cases, the server 104 may be associated with a merchant site that offers items (e.g., physical items or digital content items) for acquisition (e.g., purchase or lease/rental). The server 104 may host a catalog that includes software applications ("apps") that are available for acquisition.

As illustrated in FIG. 1, the computer readable media 110 includes native code libraries 112 and an application library 114. The application library 114 includes one or more applications that may be provided to the computing device 102. At least some of the applications in the application library 114 may be available for acquisition. The server 104 may select one or more applications 116 from the application library 114 and determine (e.g., identify) a subset 118 of the native code libraries 112 that may be used by the applications 116. For example, the server 104 may select the one or more applications 116 from the application library in response to (1) a request from the computing device 102 to acquire the one or more applications 116 or (2) determining that the one or more applications 116 are updated versions of applications previously acquired by the computing device 102. Of course, the computer readable media 110 may also include software modules, device drivers, an operating system, and the like. The server 104 may create a wrapper library 120 based on the selected applications 116. The wrapper library may enable the applications 116 to access the subset 118 of the native code libraries 112.

The computing device 102 may include one or more processors 122 and one or more computer readable media 124 (e.g., memory). The computer readable media 124 may include software modules, device drivers, an operating system, and the like. The computing device 102 may be an electronic book (eBook) reader device (102-1), a tablet computing device (102-2), a personal computer (102-3), a wireless phone or a portable media player (102-4), a laptop computer (102-5), a media device such as a television (102-6), another type of computing device, or any combination thereof. One or more users 126 may interact with the computing device 102.

In operation, in some implementations, in response to (i) the server 104 receiving a request 128 from the computing device 102 or (ii) the server 104 determining that the computing device 102 is to be sent an update, the server 104 may create an application package 130. For example, one of the users 126 may initiate acquisition of the software applications 116 using the server 104. In response, the server 104 may create the application package 132. As another example, the server 104 may determine that an application or a native code library currently stored in the computing device 102 is to be updated and create the application package 132 for updating the computing device 102. In other cases, an application developer may create the application package 130. The application developer may provide the application package 130 to a merchant that offers multiple application packages, including the application package 130, for acquisition.

The application package 130 may include zero or more applications 116. For example, the application package 130 may include zero applications if the application package 130 is used to update native code libraries that are stored on the computing device 102. As another example, the application package 130 may include one or more of the applications 116 from the application library 114 that are to be provided to the computing device 102.

The application package 130 may include a library area 132 (e.g., a first area) and a hidden area 134 (e.g., a second area). The library area 132 may be accessed by an application package installer provided by an operating system of the computing device 102. In contrast, the hidden area 134 may not be accessed by the application package installer provided by the operating system of the computing device 102. The server 104 may create the wrapper library 120 and store the wrapper library 120 in the library area 132 of the application package 130. In some cases, the wrapper library 120 (or portions thereof) may be compressed before being stored in the library area 132. For example, a compression format such as zip or other similar compression format may be used to compress the wrapper library 120.

The server 104 may identify the subset 118 of the native code libraries 112 for inclusion in the application package 130. For example, the server 104 may identify the subset 118 based on which of the native code libraries 112 are used by the applications 116. To illustrate, the subset 118 may include libraries from the native code libraries 112 that are used by the applications 116 and exclude libraries from the native code libraries 112 that are not used by the applications 116.

The wrapper library 120 may enable applications executing on the computing device 102 to access the subset 118 of the native code libraries 112 without using an operating system provided interface (e.g., such as JNI). For example, applications executing on the computing device 102 may call the wrapper library 120 and the wrapper library 120 may in turn call the subset 118 along with any arguments that were passed in with the call. The server 104 may create the wrapper library 120 based on the applications 116 that are included in the application package 130.

The server 104 may determine a loading order 136 for loading each native code library from the subset 118 of the native code libraries 112 when the subset 118 is loaded into the computer readable media 124 of the computing device 102. For example, the server 104 may determine dependencies 138 among each of the native code libraries of the subset 118 and determine the loading order 136 based on the dependencies 138. In some implementations, the server 104 may store each native code library of the subset 118 in the hidden area 134 of the application package 130 according to the loading order 136. In other implementations, the server 104 may store a file in the application package 130 that includes the loading order 136. The subset 118 (or portions thereof) may be compressed before being stored in the hidden area 134. For example, a compression format such as zip or other similar compression format may be used to compress one or more of the native code libraries in the subset 118 before they are stored in the hidden area 134.

The server 104 may store a custom loader 140 in the application package 130. For example, the custom loader 140 may be stored in the library area 132 of the application package 130. In some cases, the custom loader 140 and the wrapper library 120 may be stored in a single file in the application package 130. The custom loader 140 may load the subset 118 of the native code libraries 112 into the computer readable media 124 of the computing device 102. For example, if each native code library of the subset 118 is stored in the hidden area 134 according to the loading order 136, the custom loader 140 may sequentially read and load each native code library from the subset 118. Thus, the subset 118 of the native code libraries 112 may be efficiently loaded because the loader does not spend time determining the dependencies 138 prior to loading each of the native code libraries of the subset 118. The efficient loading may improve an experience of the users 126 by reducing the time taken to load native code libraries. In some implementations, the custom loader 140 may load the subset 118 into the computer readable media 124 in response to one of the users 126 instructing the computing device 102 to initiate execution of an application that uses one or more of the native code libraries in the subset 118.

After the application package 130 has been created, the application package 130 may be sent or made available for download to the computing device 102. In some implementations, the server 104 may send the application package 130 to the computing device 102 using the network 106. In other implementations, the server 104 may store the application package 130 in a download area and notify the computing device 102 that the application package 130 is available for download. In response, the computing device 102 may download the application 130 from the download area.

After the computing device 102 has received or downloaded the application package 130, an application package installer provided by an operating system of the computing device 102 may access the wrapper library 120 in the library area 132 of the application package 132. The application package installer may determine whether the wrapper library 120 is stored in the application package 130 in a compressed format. If the wrapper library 120 is stored in the application package 130 in a compressed format, the application package installer may uncompress the wrapper library 120. Thus, the application package installer may read the wrapper library 120 from the application package 130, uncompress the wrapper library 120 if the wrapper library 120 is in a compressed format, and store the wrapper library in the computer readable media 124. In some cases, the application package installer may read the custom loader 140 from the library area 132 of the application package 130 and store the custom loader 140 in the computer readable media 124 of the computing device 102.

The application package installer may store the application package 130 in the computer readable media 124. Thus, the subset 118 may remain stored in the application package 130 until an instruction is received to initiate execution of one of the applications 116, which is described in more detail in FIG. 2. In response to one of the users 126 instructing the computing device 102 to initiate execution of an application that uses one of the native code libraries in the subset 118, the custom loader 140 may load the subset 118 from the application package into the computer readable media 124. The custom loader 140 may uncompress one or more of the native code libraries in the subset 118 if one or more of the native code libraries in the subset 118 were stored in a compressed format in the application package 130. The custom loader 140 may load the subset 118 based on the loading order 136. In some implementations, the loading order 136 may not be specified in the application package 130 and may be determined prior to loading the subset 118 into the computing device 102.

Thus, the server 104 may create an application package. The application package may include (i) a wrapper library and a custom loader stored in a library area and (ii) a subset of the native code libraries stored in a hidden area. The wrapper library may enable the applications to access the subset of the native code libraries. The wrapper library may be relatively small in size as compared to the subset of the native code libraries. Thus, a time taken to install the wrapper library in the computing device 102 may be significantly less than a time to install the relatively larger subset of the native code libraries, thereby improving a user's experience when using a computing device. In some implementations, the loading order of the subset of the native code libraries may be determined when the application package is created rather than when the application package is installed on the computing device, thereby reducing a time taken to load the subset of the native code libraries, further improving the user's experience when using the computing device.

The computer readable media 110 and 124 may include computer-readable storage media, such as volatile memory, non-volatile memory, removable memory, and/or non-removable memory, implemented in any method or technology for storage of information, such as computer-readable instructions, data structures, program modules, or other data. Also, the processors 108 and 122 may include onboard memory in addition to or instead of the computer readable media 110 and 124, respectively. Examples of storage media that may be included in the computer readable media 110 and 124 and/or processors 108 and 122 include, but are not limited to, non-transitory media, such as random access memory (RAM), read only memory (ROM), electrically erasable programmable read only memory (EEPROM), flash memory or other memory technology, compact disk (CD-ROM), digital versatile disks (DVD) or other optical storage, magnetic tape, magnetic disk storage or other magnetic storage devices, or any other medium which can be used to store the desired information and which can be accessed by the processors 108 and 122. Any such computer-readable storage media may be part of the architecture 100. The computer readable media 110 and computer readable media 124 may include software programs or other executable modules that may be executed by the processors 108 and 122, respectively.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processors 108, as hardware, and/or as firmware. Typically, the functionality of the program modules may be combined or distributed as desired in various embodiments. An implementation of these modules and techniques may be stored on or transmitted across some form of computer-readable media.

Figure 2:
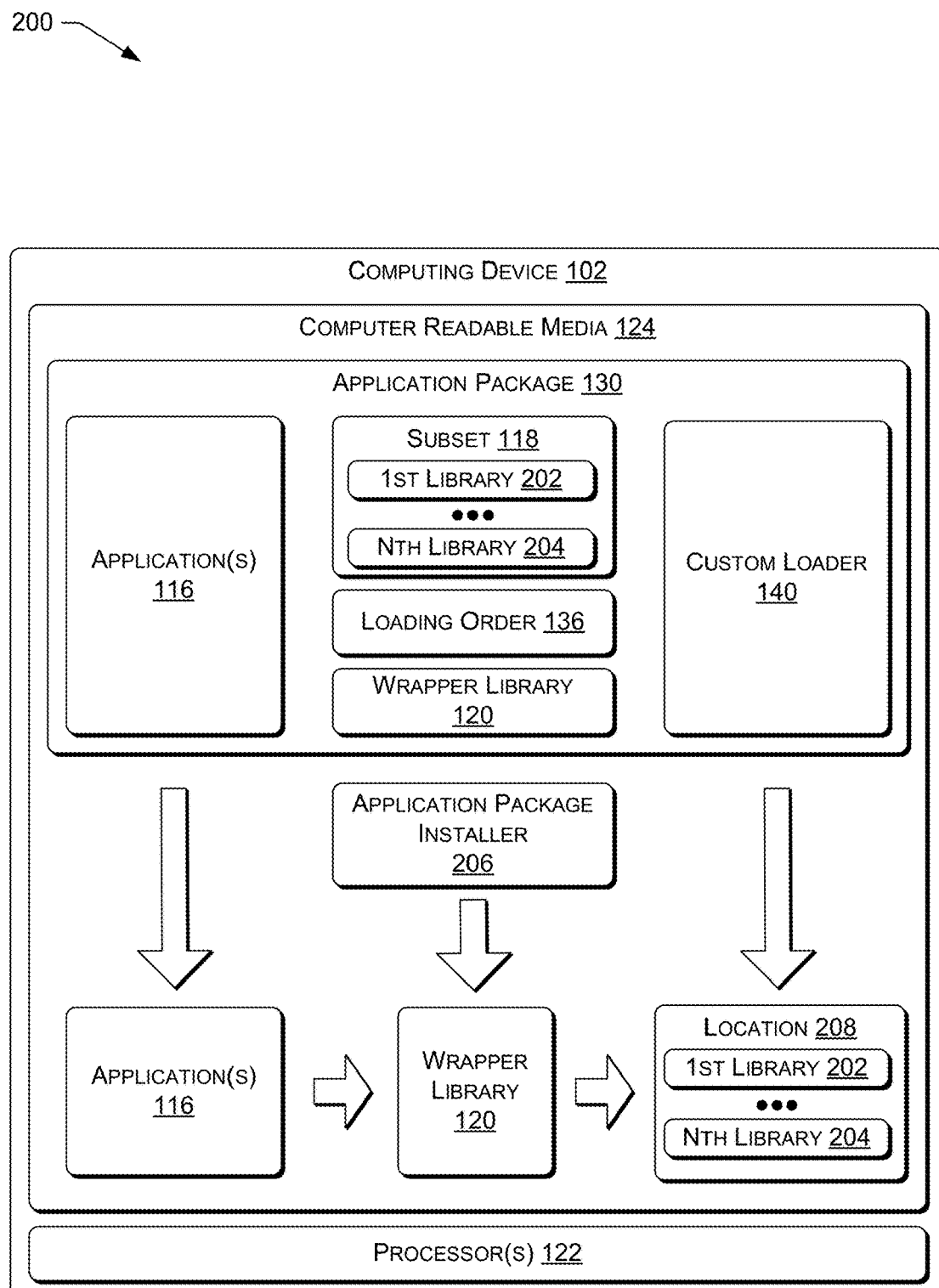
FIG. 2 is an illustrative architecture that includes installing a wrapper library and native code libraries according to some embodiments.

FIG. 2 is an illustrative architecture 200 that includes installing a wrapper library and native code libraries according to some embodiments. The architecture 200 illustrates how the custom loader 140 may load native code libraries from the subset 118 into the computer readable media 124 of the computing device 102.

The subset 118 may include one or more native code libraries, such as a first library 202 up to an Nth library 204 (where N>0). In some implementations, the application package 130 may include a loading order 136 indicating an order in which the N libraries 202 to 204 are to be loaded from the application package 130 into the computing device 102. In other implementations, the custom loader 140 may determine the loading order 136 prior to loading the N libraries 202 to 204. The loading order 136 may be determined based on dependencies among the N libraries 202 to 204. The loading order 136 may be explicit or implicit. An example of an implicit loading order may be when each of the N native code libraries 202 to 204 are stored in the application package 130 in an order that is based on the order in which the native code libraries 202 to 204 are to be loaded into the computer readable media 124. In this example, the N native code libraries 202 to 204 may be read and loaded into memory using the order in which the N libraries 202 to 204 are stored in the application package 130. An example of an explicit loading order may be storing a file in the application package 130 that specifies an order in which the N libraries 202 to 204 are to be loaded into the computer readable media 124.

In response to the computing device 102 receiving the application package 120, an application package installer 206 (e.g., a portion of an operating system of the computing device 102) may determine a location of the wrapper library 120, the custom loader 140, or both. The application package installer 206 may extract the wrapper library 120, the custom loader 140, or both from the application package 130 and store the wrapper library 120, the custom loader 140, or both in the computer readable media 124. If the wrapper library 120, the custom loader 140, or both were stored in a compressed format in the application package 130, the application package installer 206 may uncompress the wrapper library 120, the custom loader 140, or both prior to storing the wrapper library 120, the custom loader 140, or both in the computer readable media 124. The application package installer 206 may store the application package 130 in the computer readable media 124.

In response to the computing device 102 receiving an instruction to initiate execution of one or more of the applications 116, the applications 116 may be extracted into the computer readable media 124 of the computing device 102, and the applications 116 may be executed by the processors 122. At least one of the applications 116 that are being executed may instruct the custom loader 140 to load the N libraries 202 to 204 into the computer readable media 124. In some cases, at least one of the applications 116 may send a request to an operating system of the computing device 102 to instruct the custom loader 140 to load the N libraries 202 to 204. The custom loader 140 may determine a size of the subset 118 (e.g., a size of the uncompressed subset 118) and identify a location 208 in the computer readable media 124 that is capable of storing the N libraries 202 to 204 based on the size. For example, the location 208 may be a contiguous area of the computer readable media 124 that is capable of storing the N libraries 202 to 204. By identifying the location 208 rather than using a pre-specified location that may already be in use by the operating system, a conflict in which the application attempts to access a location that is already being used (e.g., by the operating system) may be avoided.

If the loading order 136 is implicit, the custom loader 140 may read the native code libraries of the subset 118, starting with the first library 202 and continuing up to and including the Nth library 204. The custom loader 140 may uncompress the N libraries 202 to 204 if the N libraries 202 to 204 are stored in a compressed format. If the loading order 136 is implicit, the custom loader 140 may load the libraries 202 to 204 into the computer readable media 124, starting with the first library 202 and continuing on until the Nth library 204. If the loading order 136 is explicit, the custom loader 140 may read the native code libraries N libraries 202 to 204 from the application package 130 and store the N libraries 202 to 204 in a file system (e.g., the computer readable media 124) of the computing device 102 based on an order specified by the loading order 136. In some implementations, if the loading order 136 is not specified in the application package 130, the custom loader 140 may determine the loading order 136 before loading the N libraries 202 to 204.

After the N libraries 202 to 204 have been loaded into the computer readable media 124 of the computing device 102, the applications 116 may access the N libraries 202 to 204 by calling the wrapper library 120. The wrapper library 120 may be loaded into the computer readable media 124 by an application package installer 206 when the application package 130 is being installed in the computing device 102.

Thus, the N libraries 202 to 204 may remain in the application package 130 until an application that uses one of the N libraries 202 to 204 begins executing. In some implementations, the N libraries 202 to 204 may be stored in the application package 130 using a compressed format. The N libraries 202 to 204 may use less memory resources as compared to a conventional operating system approach in which the N libraries 202 to 204 are stored in the application package 130 in a compressed format while also being stored in the computer readable media 124 in an uncompressed format. In addition, by identifying the location 208 in which the N libraries 202 to 204 are loaded rather than using a predetermined location, memory conflicts may be avoided. Furthermore, the custom loader 140 may use the loading order 136 specified in the application package 130 when loading the N libraries 202 to 204. By using the loading order 136, the N libraries 202 to 204 may be loaded into the computer readable media 124 very quickly, thereby improving the experience of the users 126 when using the computing device 102.

Example Processes

Figure 3:
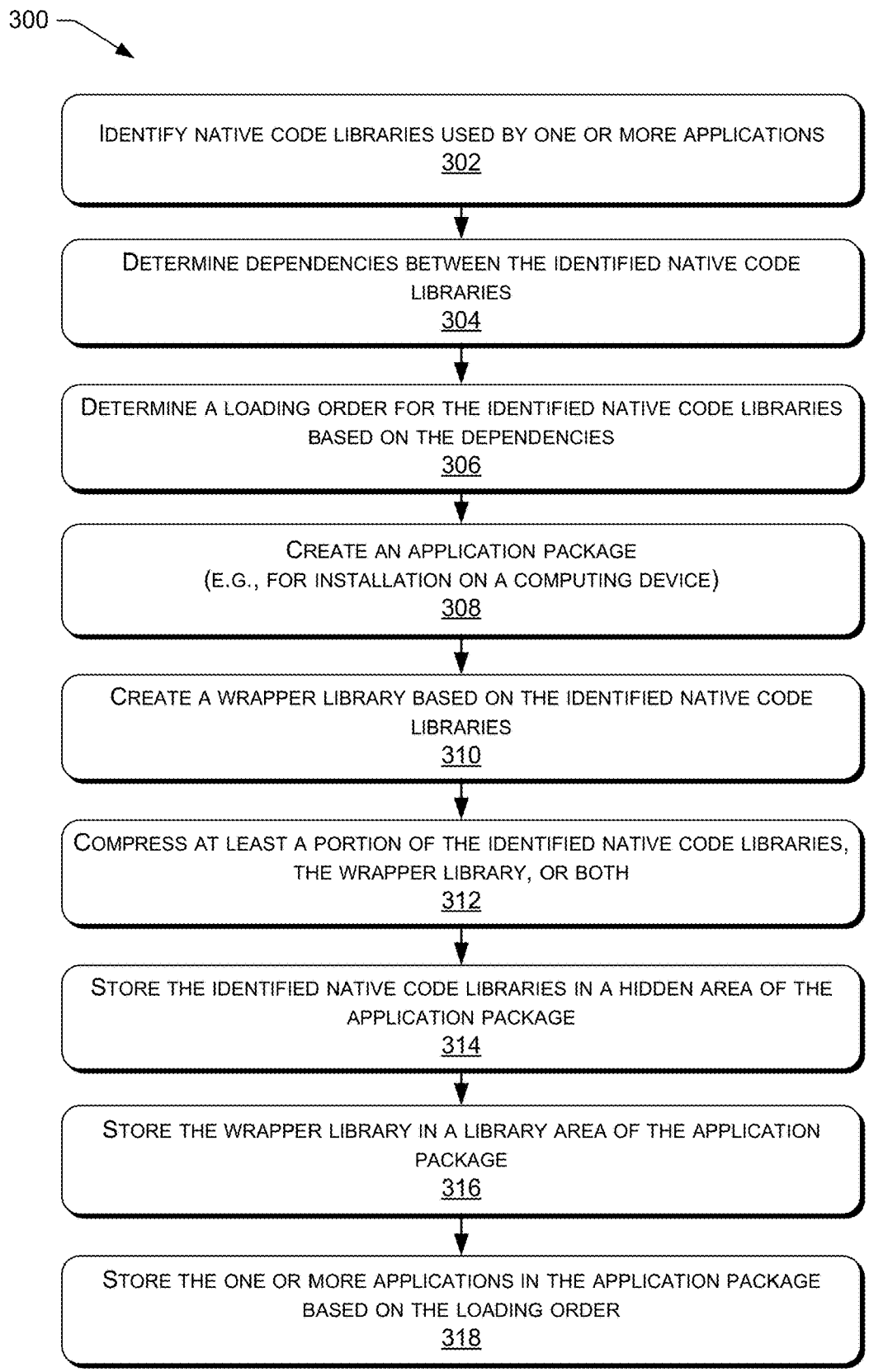
FIG. 3 is a flow diagram of an illustrative process to create an application package according to some embodiments.
Figure 4:
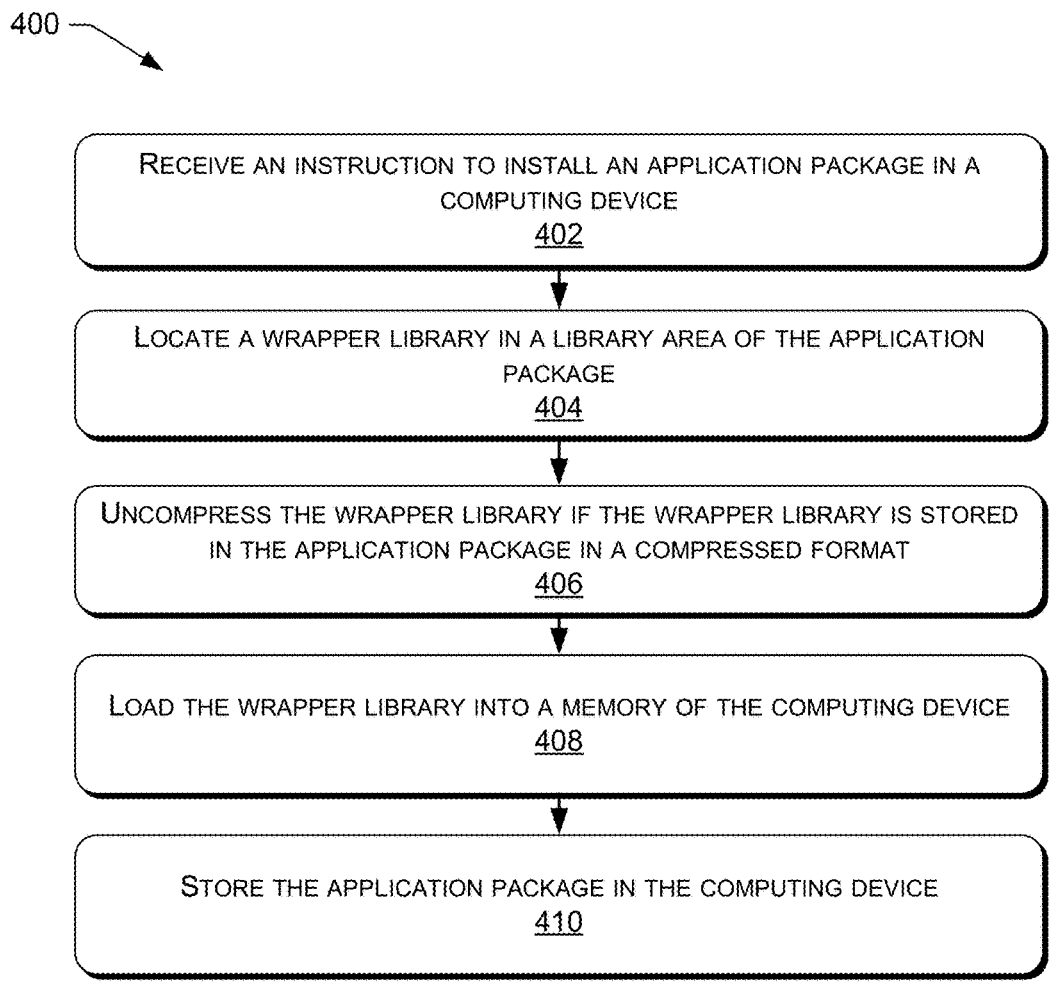
FIG. 4 is a flow diagram of an illustrative process to install an application package in a computing device according to some embodiments.
Figure 5:
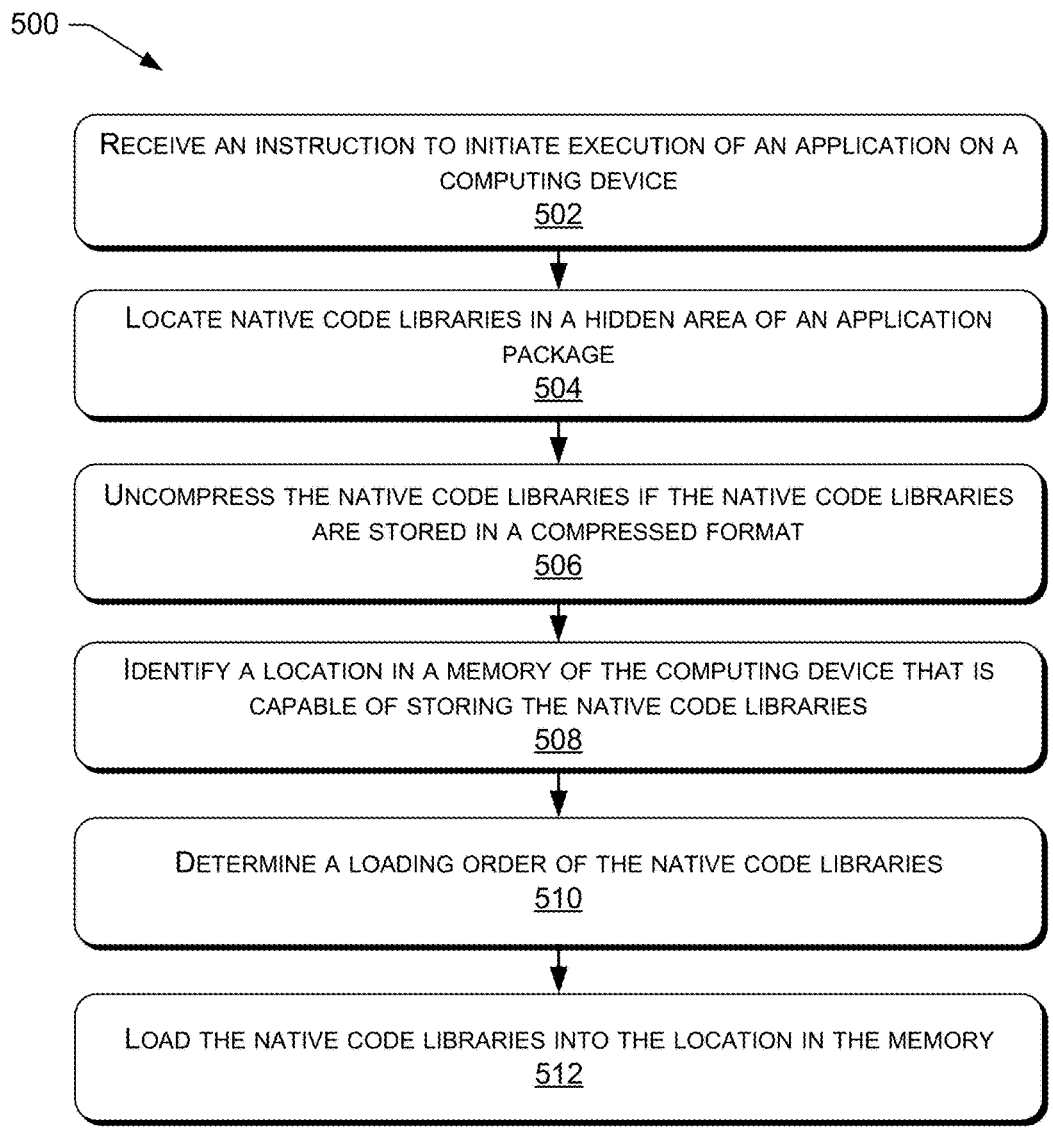
FIG. 5 is a flow diagram of an illustrative process to load native code libraries into a memory of a computing device according to some embodiments.

In the flow diagrams of FIGS. 3, 4 and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400 and 500 are described with reference to the architectures 100 and 200 as described above, although other models, frameworks, systems and environments may implement these processes.

Creating an Application Package

FIG. 3 is a flow diagram of an illustrative process 300 to create an application package according to some embodiments. The process 300 may be performed by the server 104 of FIG. 1.

At 302, native code libraries used by one or more applications may be identified. For example, in FIG. 1, the server 104 may identify the subset 118 of the native code libraries 112 used by the one or more applications 116.

At 304, dependencies between the identified native code libraries may be determined. For example, in FIG. 1, the server 104 may determine the dependencies 128 between each of the native code libraries in the subset 118.

At 306, a loading order for the identified native code libraries may be determined based on the dependencies. For example, in FIG. 1, the server 104 may determine the loading order 136 for each of the native code libraries in the subset 118 based on the dependencies 128. In some cases, the loading order may be determined by the custom loader 140 before the custom loader 140 loads the N libraries 202 to 204 into the computer readable media 124.

At 308, an application package may be created. For example, in FIG. 1, the server 104 may create the application package 130.

At 310, a wrapper library may be created based on the identified native code libraries. For example, in FIG. 1, the wrapper library 120 may be created based on the subset 118 of the native code libraries 112.

At 312, at least a portion of the identified native code libraries, the wrapper library, or both may be compressed.

At 314, the identified native code libraries may be stored, based on the loading order, in a hidden area of the application package. For example, in FIG. 1, the server 104 may compress at least a portion of the subset 118 before storing the subset 118 in the hidden area 134 of the application package 130. The native code libraries in the subset 118 may be stored in the application package 130 based on the loading order 136.

At 316, the wrapper library may be stored in a library area of the application package. For example, in FIG. 1, the server 104 may compress at least a portion of the wrapper library 120 before storing the wrapper library 120 in the library area 132 of the application package 130. In some cases, a custom loader to load native code libraries into a memory of a computing device may be stored in the library area 132.

At 318, the one or more applications may be stored in the application package. For example, in FIG. 1, the server 104 may store the subset 118 of the native code libraries 112 in the application package 130.

Thus, the server 104 may create the application package 132 that includes the library area 132 and the hidden area 134. The server 104 may identify the subset 118 of the native code libraries 112 that are used by the applications 116 and store the subset 118 in the hidden area 134. The server 104 may create the wrapper library 120 based on the subset 118 and store the wrapper library 120 in the library area 132 of the application package 130. The server 104 may compress at least a portion of the wrapper library 120, the subset 118, or both before storing them in the application package 130. Storing the subset 118 in the hidden area 134 may reduce a time taken to install the application package 130 because the wrapper library 116 rather than the subset 118 is installed when the application package 130 is installed. In addition, storing the subset 118 in the hidden area 134 may reduce an amount of the computer readable media 124 of the computing device 102 that is used by the subset 118 by avoiding the duplication that would result if the subset of 118 was installed in the computer readable media 124 along with the application package 130. Furthermore, by determining the loading order of the subset 118 before sending the application package 130 to the computing device 102, the subset 118 of the native code libraries 112 may be quickly loaded into the computing device 102.

Installing an Application Package

FIG. 4 is a flow diagram of an illustrative process 400 to install an application package in a computing device according to some embodiments. The process 400 may be performed by the application package installer 206 of FIG. 2.

At 402, an instruction to install an application package in a computing device may be received. For example, in FIG. 2, the application package installer 206 may receive an instruction (e.g., from an operating system executing on the computing device 102) to install the application package 130 after the application package 130 is received or downloaded from the server 104.

At 404, a wrapper library and/or a custom loader that are located in a library area of the application package may be identified. For example, in FIG. 2, the application package installer 206 may locate the wrapper library 120 and/or the custom loader 140 by accessing the library area 132 of the application package 130. In some cases the wrapper library and the custom loader may be combined into a single file that is stored in the application package.

At 406, the wrapper library may be uncompressed if the wrapper library was stored in the application package in a compressed format. For example, in FIG. 2, the application package installer 206 may uncompress the wrapper library 120 if the wrapper library 120 was stored in a compressed format (e.g., such as zip or similar format) in the application package 130.

At 408, the wrapper library and/or the custom loader may be loaded into a memory of the computing device. For example, in FIG. 2, the application package installer 206 may load the wrapper library 120 in the computer readable media 124 of the computing device 102. The wrapper library 120 may enable the applications 116 to directly access the N native code libraries 202 to 204. For example, when one of the applications 116 calls the wrapper library 120, the wrapper library 120 may forward the call, along with any arguments, to one or more of the N libraries 202 to 204.

At 410, the application package may be loaded into a memory of the computing device. For example, in FIG. 2, the application package installer 206 may load the application package 130 into the computer readable media 124 of the computing device 102.

Thus, when an application package (e.g., the application package 130) is received or downloaded by a computing device, an application package installer may access a library area of the application package and load any libraries (e.g., the wrapper library 120) that are stored in the library area into a file system (e.g., a memory) of the computing device. The application package installer may load the application package into the file system of the computing device. Because the wrapper library is substantially smaller in size as compared to native code libraries, the application package may be installed relatively quickly as compared to a conventional system that loads the native code libraries into the memory of the routing device. Thus, using the process 400, the amount of time to install an application package on the computing device 102 may be reduced.

Loading Native Code Libraries

FIG. 5 is a flow diagram of an illustrative process 500 to load native code libraries into a memory of a computing device according to some embodiments. The process 500 may be performed by the custom loader 140 of FIG. 1 and FIG. 2.

At 502, an instruction to initiate execution of an application on a computing device may be received. For example, in FIG. 2, an instruction may be received from a user of the computing device 102 to initiate execution of one or more of the applications 116.

At 504, a location of native code libraries in a hidden area of an application package may be identified. For example, in FIG. 2, the custom loader 140 may determine that the N native code libraries 202 to 204 are located in the hidden area 134 of the application package 130.

At 506, the native code libraries may be uncompressed if the native code libraries were stored in a compressed format. For example, in FIG. 2, the custom loader 140 may uncompress any of the N native code libraries 202 to 204 that are stored in a compressed format in the application package 130.

At 508, a location in a memory of the computing device that is capable of storing the native code libraries may be identified. For example, in FIG. 2, the custom loader 140 may identify the location 208 that is capable of storing the N native code libraries 202 to 204 based on a size of the N native code libraries 202 to 204.

At 510, a loading order of the native code libraries may be determined. For example, in FIG. 2, the custom loader 140 may determine the loading order 136. The loading order 136 may be implicit based on an order in which the N libraries 202 to 204 are stored in the application package 130 or the loading order 136 may be explicitly specified in a file located in the application package 130. The loading order may be determined based on dependencies among the N native code libraries 202 to 204.

At 512, the native code libraries may be loaded into the location in the memory based on the loading order. For example, in FIG. 2, the custom loader 140 may load the N libraries 202 to 204 into the computer readable media 124 of the computing device 102.

Thus, when execution of an application that uses native code libraries is initiated, the native code libraries may be loaded into a memory of a computing device. Because the loading order of the native code libraries is determined when the application package is created, the native code libraries may be quickly loaded into the memory based on the predetermined loading order. In addition, by determining a location in the memory of the computing device that is capable of storing the native code libraries, rather than using a predetermined memory location, memory conflicts caused by more than one application accessing the same memory location may be avoided.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method under control of one or more processors configured with computer-executable instructions, the method comprising:
identifying a first native code library and a second native code library used by an application, the first native code library and the second native code library comprising instructions included in an instruction set of a processor for a computer device;
creating a wrapper library for the first native code library and the second native code library, the wrapper library configured to:
receive a call from the application, and
translate the call to access at least one of the first native code library or the second native code library;
creating an application package that includes a custom loader, a library area, and a hidden area;
storing the wrapper library and the custom loader in the library area of the application package;
storing the application in the application package;
storing the first native code library and the second native code library in the hidden area, wherein the hidden area is configured to be inaccessible to an application package installer but is accessible to the custom loader, wherein the application package installer is configured to install the custom loader and the wrapper library, and wherein the custom loader is configured to load the first native code library and the second native code library from the hidden area into memory of the computer device based at least in part on determining that the application has initiated execution;
compressing the first native code library and the second native code library to generate a compressed native code library; and
sending, over one or more networks, the application package that includes the compressed native code library to the computer device.

2. The method of claim 1, further comprising:
determining a dependency between the first native code library and the second native code library; and
determining a loading order of the first native code library and the second native code library based on the dependency.

3. The method of claim 2, further comprising storing the first native code library and the second native code library in the hidden area of the application package based on the loading order.

4. The method of claim 1, further comprising sending the application package to an operating system of the computer device to install the wrapper library and the custom loader on the operating system.

5. The method of claim 1, further comprising compressing at least a portion of the wrapper library before storing the wrapper library in the application package.

6. A system comprising:
one or more processors; and
one or more computer-readable storage media comprising instructions executable by the one or more processors to perform operations comprising:
identifying a first native code library and a second native code library used by a software application;
creating a wrapper library configured to access the first native code library and the second native code library, the wrapper library further configured to forward a call from the software application to the first native code library and the second native code library;
storing the wrapper library and a custom loader in a library area of an application package;
storing the first native code library and the second native code library in a hidden area of the application package, wherein the hidden area is configured to be inaccessible to an application package installer executed by a computer device but is accessible to the custom loader, wherein the application package installer is configured to install the custom loader and the wrapper library, and wherein the custom loader is configured to load the first native code library and the second native code library from the hidden area into memory of the computer device based at least in part on determining that the software application has initiated execution;

compressing the first native code library and the second native code library to generate a compressed native code library; and sending, over one or more networks, the application package that includes the compressed native code library to the computer device.

7. The system of claim 6, wherein the operations further comprise compressing at least a portion of the wrapper library before storing the wrapper library in the application package.

8. The system of claim 6, the operations further comprising:

determining that the software has been selected for execution by the computer device; and causing the hidden area to be accessed by the custom loader based at least in part on determining that the software application has been selected for execution by the computer device.

9. The system of claim 6, wherein the library area is configured to be accessible to the application package installer executed by the computer device.

10. The system of claim 6, wherein the application package includes a plurality of additional native code libraries including at least the first native code library and the second native code library.

11. The system of claim 6, the operations further comprising:

determining dependencies among individual ones of a plurality of additional native code libraries;

determining a loading order of the plurality of additional native code libraries based on the dependencies; and storing the plurality of native code libraries in the hidden area of the application package based at least in part on the loading order.

12. The system of claim 11, the operations further comprising compressing the plurality of additional native code libraries prior to storing the plurality of native code libraries in the hidden area of the application package.

13. One or more non-transitory computer-readable media storing instructions executable by one or more processors to perform acts comprising:

identifying a plurality of native code libraries for use by a software application, the plurality of native code libraries including a first native code library and a second native code library;

creating a wrapper library configured to receive a call from the software application and to translate the call to access at least the first native code library and the second native code library;

storing the wrapper library and a custom loader in a first area of an application package;

storing the plurality of native code libraries in a secure second area of the application package, wherein the secure second area is configured to be inaccessible to an application package installer but is accessible to the custom loader, wherein the application package installer is configured to install the custom loader and the wrapper library, and wherein the custom loader is configured to load the first native code library and the second native code library from the secure second area into memory of a computer device based at least in part on determining that the software application has initiated execution;

compressing the plurality of native code libraries in the secure second area to generate a compressed native code library; and sending, over one or more networks, the application package that includes the compressed native code library to the computer device.

14. The one or more non-transitory computer-readable media of claim 13, wherein the first area is configured to be accessed by the application package installer on the computer device.

15. The one or more non-transitory computer-readable media of claim 13, further comprising:

determining that the software application has been selected for execution by the computer device; and causing the secure second area to be accessed by the custom loader based at least in part on determining that the software application has been selected for execution by the computer device.

16. The one or more non-transitory computer-readable media of claim 13, further comprising compressing at least a portion of the wrapper library before storing the wrapper library in the application package.

17. The one or more non-transitory computer-readable media of claim 13, further comprising:

determining dependencies between individual native code libraries of the plurality of native code libraries; and storing individual native code libraries of the plurality of native code libraries in an order in the secure second area of the application package, the order determined based at least in part on the dependencies.

18. The one or more non-transitory computer-readable media of claim 13, wherein the custom loader is configured to load the individual native code libraries of the plurality of native code libraries into a memory of a computer device based at least in part on an order.

19. The one or more non-transitory computer-readable media of claim 13, further comprising compressing the wrapper library.

* * * * *